US006341001B1

(12) United States Patent
Kwok

(10) Patent No.: US 6,341,001 B1
(45) Date of Patent: Jan. 22, 2002

(54) REFLECTIVE ACTIVE MATRIX LIQUID CRYSTAL DISPLAYS WITH MIXED TWISTED NEMATIC AND BIREFRINGENT MODES

(75) Inventor: Hoi-Sing Kwok, Kowloon (HK)

(73) Assignees: Varintelligent (BVI) Limited, Tortola (VG); Terence Leslie Johnson, London (GB)

( * ) Notice: Subject to any disclaimer, the term of this patent is extended or adjusted under 35 U.S.C. 154(b) by 0 days.

(21) Appl. No.: 09/450,293

(22) Filed: Nov. 29, 1999

Related U.S. Application Data

(60) Provisional application No. 60/110,358, filed on Nov. 30, 1998.

(51) Int. Cl.[7] ........................ G02F 1/1335; C09K 19/02
(52) U.S. Cl. ........................ 349/96; 349/99; 349/180; 349/181
(58) Field of Search ........................ 349/96, 179, 180, 349/181, 99

(56) References Cited

U.S. PATENT DOCUMENTS

| | | | | |
|---|---|---|---|---|
| 5,105,289 A | * | 4/1992 | Sonehara et al. | 359/70 |
| 5,139,344 A | | 8/1992 | Okamura | |
| 5,907,378 A | * | 8/1999 | Abileah et al. | 349/123 |
| 5,933,207 A | * | 8/1999 | Wu | 349/99 |

FOREIGN PATENT DOCUMENTS

| | | |
|---|---|---|
| GB | 2286059 | 2/1995 |
| GB | 2318878 | 6/1998 |

OTHER PUBLICATIONS

High–Brightness Prejection Display Using Mixed–Mode Twisted–Nematic Liquid–Crystal Cells, S.–T. Wu, C.–S. Wu, Hughes Research Laboratories, Mallibu, CA, 1997.*

Optical Modeling of Small Pixels in Reflective Mixed –Mode Twisted–Nematic Cells. H. C. Huang, D. D. Huang and J. Chen. Centre for Display Research & Department of Electrical and Electronic Engineering, The Hong Kong University of Science and Technology Kowloon, Hong Kong, 1999.*

Wu et al., Mixed Mode Twisted Nematic Liquid Crystal Cells for Reflective Displays 320 *Applied Physics Letters* 68 (1996) Mar. 11, No. 11.

Suh and Patel et al., Reflective Homeotrophic Mode in a Twisted Nematic Liquid Crystal 320 *Applied Physics Letters* 73 (1998)24 Aug., No. 8.

European Search Report, EP 99 30 9451, Berlin, Mar. 27, 2000.

Kim et al., Electrically Controlled Birefringence Mode in Twisted Hybrid Aligned Nematic for Reflective LCDs 320 *Applied Physics Letters*, n.v. (1997) 15 Sep.

* cited by examiner

*Primary Examiner*—Kenneth Parker
*Assistant Examiner*—Mike Qi
(74) *Attorney, Agent, or Firm*—Wood, Phillips, VanSanten, Clark & Mortimer

(57) ABSTRACT

A generalized mixed twisted nematic/birefringent effect mode is presented for reflective liquid crystal displays with only one polarizer. This new MTB mode encompasses all previously published reflective nematic liquid crystal display modes and is clearly shown on the parameter space diagrams. The invention of how to obtain operating conditions of this generalized mixed mode display is discussed. For any given angle between the polarizer and the input director of the liquid crystal cell, a unique range of values of the twist angle and the retardation $d\Delta n$ for efficient reflection and low dispersion is defined.

21 Claims, 15 Drawing Sheets

REFLECTIVE ACTIVE MATRIX LIQUID CRYSTAL DISPLAYS WITH MIXED TWISTED NEMATIC AND BIREFRINGENT MODES

This application claims the benefit of provisional application No. 60/110,358 filed Nov. 30, 1998.

The invention relates to a reflective active matrix liquid crystal display mixed with mixed twisted nematic and birefringent modes.

FIELD OF THE INVENTION

The present patent deals with reflective mode liquid crystal displays that combine the waveguiding effect and the birefringent effects of twisted nematic liquid crystals. By optimizing the various optical arrangements of the liquid crystal display such as the twist angle, the retardation and the polarizer angle, a series of mixed twisted nematic— birefringent (MTB) display modes has been invented.

There has previously been considerable activity in the study of reflective liquid crystal displays (RLCD). Broadly speaking RLCD can be divided into 2 categories: those that do not rely or polarizers and those that do. Examples of the former are reflective cholesteric displays and absorptive guest-host displays. The latter categories are necessarily nematic liquid crystal displays. These are displays that are based on polarization manipulation, as in ordinary twisted nematic LCDs. However, unlike ordinary LCD, there is only one front polarizer and the rear polarizer is eliminated.

The main applications for such RLCDs are in direct view displays with no backlighting, and in projection displays using crystalline silicon backplane with integrated CMOS drivers, or in reflective liquid crystal light valves (LCLV) in general.

Reflective nematic LCD has been investigated. One of the successful inventions is the so-called TN-ECB mode. A variation of this has been reported recently by Wu et al. It has a 90° twist angle. There are many names given to display modes that operate on a combination of the waveguiding TN effect and the pure birefringent effect, e.g. the 45°, hybrid-field-effect (HFE) mode, the 63°, TN-ECB mode the 90° mixed TN (MTN) mode, the self-compensated TN (SCTN) mode and the 52° RTN mode.

A generalized picture of reflective twisted nematic LCD is disclosed herein that encompasses all of these mixed mode displays, and provide a method of optimizing them all at the same time. Many new operating conditions can be found that have not been reported and are the subject of the present invention.

These reflective liquid crystal displays can be fabricated on passive matrix or active matrix backplanes. The active matrix backplane can be fabricated on glass or on silicon wafers.

SUMMARY OF THE INVENTION

As shown in FIG. 1, the reflective nematic LCD consists of a polarizer, a twisted nematic liquid crystal cell, and a reflector, which can be part of a circuit in an active matrix device. The polarizer can either be a sheet type polarizer or a polarizing beam splitter as shown. In this invention, the PBS case is generally described as it is the most popular geometry for silicon microdisplays.

As discussed in the paper by H. S. Kwok, ["Parameter space representation of liquid crystal display operating modes, J. Appl. Phys., 80(7), 3687–3693 (1996)], all nematic RLCD modes can be represented in the parameter space diagram The parameter space in the case of twisted nematic RLCD is particularly useful, as it shows the relationship between the TN-ECB, MTN, SCTN and ECB modes. The reflectance R of the RLCD is a function of 3 major parameters: twist angle $\phi$, polarizer angle $\alpha$ between the polarizer and the input director of the LC cell, and the LC cell retardation $d\Delta n$ where d is the cell thickness. The wavelength $\lambda$ always appears together with the retardation as $d\Delta n/\lambda$ in the Jones matrix. Therefore it can be treated as just a scaling of $d\Delta n$. Hence, if one of the 3 parameters ($\alpha$, $\phi$, $d\Delta n$) is fixed, R can be plotted as a function of the other two parameters in a 2D parameter space using contour lines.

FIG. 2 shows a series of parameter spaces for the RLCD, with $\alpha$ varying from 0 to 45°. A wavelength of 550 nm is assumed in the calculations. The contours indicate constant reflectance in steps of 0.1. The wells in FIG. 2 are the so-called TN-ECB minima. The center of the well corresponds to either maximum reflectance for crossed polarizers or minimum reflectance for parallel polarizers. For example, with a polarizing beam splitter (PBS) in the display, ($\alpha$, $\phi$, $d\Delta n$)=(0, 63.5°, 0.181 $\mu$m) will give R=1. This corresponds to the first TN-ECB minimum. It is marked in FIG. 2 The SCTN mode and the MTN mode are also indicated in FIG. 2 for the appropriate $\alpha$.

Polarizer angles larger than 45° are not depicted in FIG. 2. It is because that beyond 45°, the parameter space repeats itself, except for a reflection of the x-axis, i.e. the parameter space for $\alpha=90°-\alpha$ is the same as the one for $\alpha$, with $\phi$ changed to $-\phi$. From FIG. 2, it can be seen that there are 2 sets of operating modes for reflective LCD. One set of modes are the "in-well" kind which correspond to the islands in the parameter space, such as the TN-ECB, MTN, SCTN modes. The other set of modes are the "out-well" modes which are located outside the TN-ECB wells, such as the RTN, RSTN and HFE modes.

The "in-well" modes are disclosed herein. It can be seen in FIG. 2 that the various TN-ECB minima move systematically in the parameter space as $\alpha$ is changed. In particular, the first TN-ECB mode with $+\phi$ is examined. It can be seen that this mode becomes the MTN mode at $\phi=900°$, $\alpha=22°$, then it becomes the SCTN mode at $\phi=60°$, $\alpha=30°$. Finally, this first TN-ECB minimum becomes the true ECB mode at $\phi=0°$ and $\alpha=45°$.

The situation is clearly shown by a plot of the trajectory of the center of the first TN-ECB minimum for the $+\phi$ case as shown in FIG. 3. In this plot, $\alpha$ goes from 0 to 45° in steps of 5°. It can be seen the first TN-ECB minimum first moves out and then towards the y-axis. The retardation increases monotonically as $\alpha$ increases. The maximum twist angle reaches 70.2° at a polarizer angle of 15°. FIG. 4 is a similar plot of the 0.9 reflectance contours for $\alpha$ ranging from 0 to 90°, again in steps of 5°. This plot is different from FIG. 3 because we also include $\alpha$ from 45° to 90°. As can be seen from FIG. 4, as $\alpha$ goes from 45° to 90°, the originally $-\phi$ TN-ECB minimum moves into the positive $\phi$ side, thus forming a complete loop in the parameter space. This is more easily seen in a parameter space showing both positive and negative twists (FIG. 5).) Notice that the parameter space for $\alpha$ and $\alpha+90°$ are identical so that a complete trajectory is formed in FIG. 5 as a goes from 0 to 90°. FIG. 3 indicates that for twist angles from −70° to +70°, there always exists 2 first order TN-ECB minima at different polarizer angles, one with a smaller $d\Delta n$ value and one with a higher $d\Delta n$ value.

The operating points of the MTN mode, the TN-ECB mode and the SCTN mode are also indicated in FIG. 4. Thus FIG. 4 unifies the entire picture for the TN-ECB, the MTN and the SCTN modes. They all operate with a combination of polarization rotation (TN) and birefringence (ECB) effects. They differ by a rotation of the polarizer relative to the input director, or, in other words, by the proportion of TN to ECB effects. Therefore, it should be possible to perform an optimization of these modes in a general sense, allowing for variations of all 3 parameters simultaneously.

The nomenclature of these nematic reflective LCDs will now be defined. Since all of these modes operate with a combination of TN effect and ECB effect, they can be called a hybrid mode or a mixed mode. They have been called TN-ECB, MTN, SCTN or HFE in the literature. Instead of calling them the TN-ECB/MTN/HFE mode, such LCD operating modes are hereinafter referred to as the generalized mixed TN-birefringence mode, or MTB mode in short.

In the optimization of the MTB mode, it can be assumed that high reflectance is desirable. If the desired reflectance or light efficiency is set to be 0.9, then the solution will be bound by the 0.9 reflectance contours depicted in FIG. 3. This limits the parameter space tremendously. Alternately, if the desired reflectance is set to be 0.7, then the solution space opens up even larger, and includes twist angles up to 100°. The 0.7 reflectance contour is plotted in FIGS. 4–21 for polarizer angles in increasing step of 5°. This represents all the possibilities for the MTB mode. It is noted that all the previously reported modes are represented in FIGS. 4–21. For example, the 90° MTN mode of Wu et al is included in FIG. 8. The SCTN mode of Yang is included in FIG. 10.

FIG. 22 is a composite of all the R =0.7 contours in FIGS. 4–21. It is seen that there are always 2 distinct MTB modes for $\phi$ less than 70°. Usually the solution with smaller d$\Delta$n is less wavelength dispersive than the larger d$\Delta$n one. However, a large d$\Delta$n is desirable from a cell making point of view.

Table I shows the normal operating brightness of the RLCD under various polarizer geometries and using different "in-well" and "out-well" modes. It can be seen that normally white(NW) and normally black (NB) operations can be achieved in both cases, depending on the polarizer geometry. The choice of polarizers has a profound effect on the optimization of the RLCD. In order to have excellent contrast, the dark state should be made as dark as possible. This is conveniently satisfied by the homeotropic alignment of the LC under high voltage bias where d$\Delta$n =0 (the x-axis in FIG. 2). This homeotropic state is nondispersive and should be used as the dark state whenever possible. For the MTB modes, which correspond to the centre of the wells in FIG. 1, the homeotropic state can be used as the dark state if a PBS is used. The display will then be normally bright.

However, if a parallel polarizer geometry is used, the high voltage homeotropic state is the bright state and the MTB wells become the dark state. That is undesirable since the MTB wells are dispersive and cannot be made very dark. Hence the contrast will be poor. So for direct view using MTB operation, a quarterwave retardation film has to be used to reverse the bright and dark states. Another solution is to make use of the "out-well" modes such as the RTN and HFE modes as the bright state. In the case of the RTN, the dark state can be made reasonable dark by further optimization of the polarizer angle Table II summarizes some of the new MTB modes provided using the parameter space method. These modes have reasonably good reflectance and low dispersion. All of them have not been presented before.

DETAILED DESCRIPTION

Figure 1:
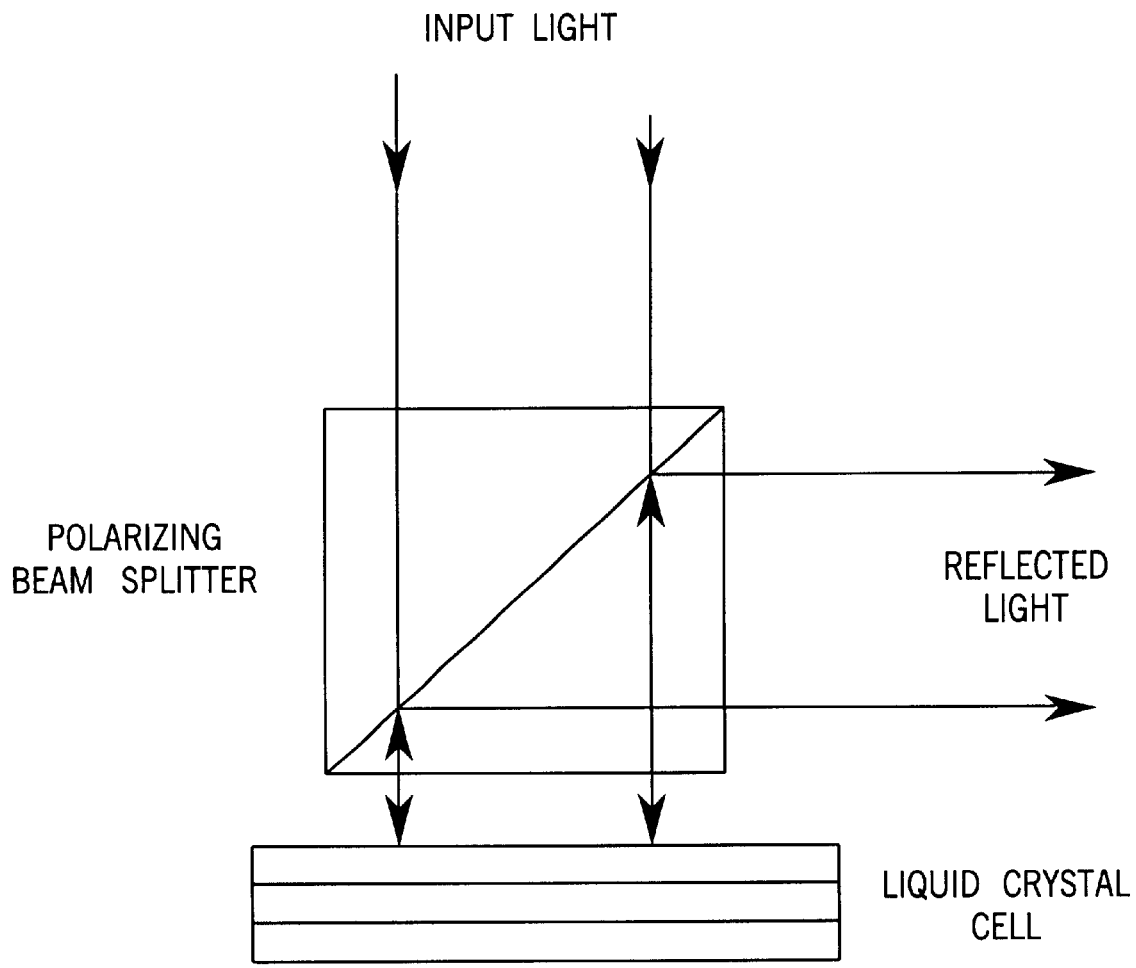
FIG. 1 Geometry of the reflective liquid crystal display.

The operation of the reflective LCD is completely determined by the twist angle $\phi$, the retardation value d$\Delta$n of the LC cell and the angle between the polarizer axis and the input director of the LC cell ax. FIGS. 4–21 represents the 0.7 reflectance contours of all the possible ($\alpha$, $\phi$, d$\Delta$n) combinations. These are defined as the MTB modes.

Here we describe details of the method to obtain the constant reflectance contour lines as depicted in FIGS. 2–21. The reflectance R is calculated by the equation $$R = \left|(-\sin\alpha \cos\alpha) \cdot H \cdot M(\phi) \cdot H^{-1} \cdot M(-\phi) \cdot \begin{pmatrix} \cos\alpha \\ \sin\alpha \end{pmatrix}\right|^2 \quad (1)$$

where H is the rotation matrix $$H = \begin{bmatrix} \cos\phi & \sin\phi \\ -\sin\phi & \cos\phi \end{bmatrix} \quad (2)$$

with 100 as the twist angle of the liquid crystal cell and α as the polarizer angle between the polarizer and the input director of the liquid crystal cell. M is the Jones matrix of the liquid crystal cell given by $$M = \begin{pmatrix} A - iB & -C - iD \\ C - iD & A + iB \end{pmatrix} \quad (3)$$

where $$A = \cos\phi\cos\beta d + \frac{q}{\beta}\sin\phi\sin\beta d \quad (4)$$

$$B = \frac{k_a}{\beta}\cos\phi\sin\beta \quad (5)$$

$$C = \sin\phi\cos\beta d - \frac{q}{\beta}\cos\phi\sin\beta d \quad (6)$$

$$D = \frac{k_a}{\beta} \cdot \sin\phi\sin\beta d \quad (7)$$

In eq. (4)–(7), $q=2\pi/p$, where p is the pitch of the LC cell; and $$\beta = [k_a^2 + q^2]^{1/2} \quad (8)$$

For a twisted nematic cell, the pitch is related to 100 by $$qd = \phi \quad (9)$$

Also $$k_a = \pi \Delta n/\lambda \quad (10)$$

where $$\Delta n = n_e - N_o \quad (11)$$

is the birefringence of the liquid crystals.

The R=0.7 contour lines in FIGS. 4–21 are obtained by setting R=0.7 in equation (1).

Table II shows the optical properties of some of the new MTB modes obtained from the above procedure. It can be seen from Table II that for each twist angle, many combinations of dΔn and α are possible to get a good contrast ratio. Also, not quite evident from Table II is the effect of changing α on the dispersion characteristics of the MTB cell. It is observed that for twist angles smaller than 70°, both the bight and the dark states become more dispersive, and also the colour coordinates of the display shifts as the voltage is varied. So they are not quite desirable.

Figures 1, 2:
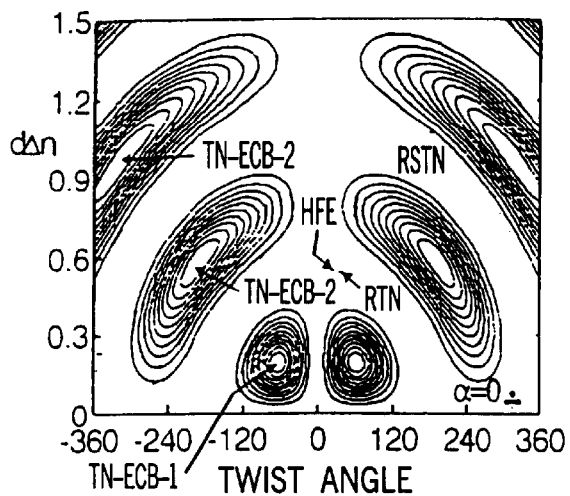
FIG. 2 Parameter spaces for the MTB mode at different polarizer angles.
Figure 2:
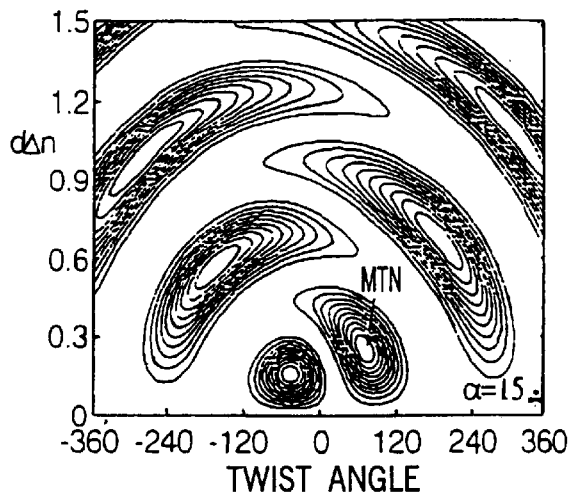
Figures 2, 3:
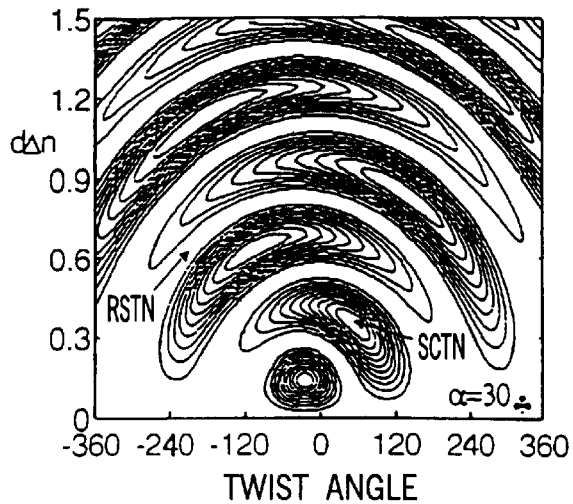
FIG. 3 Trajectory of the peak of the MTB mode as a is changed from 0 to 45°. Each point represents an increase of 5° in $\alpha$.
Figures 2, 3, 4:
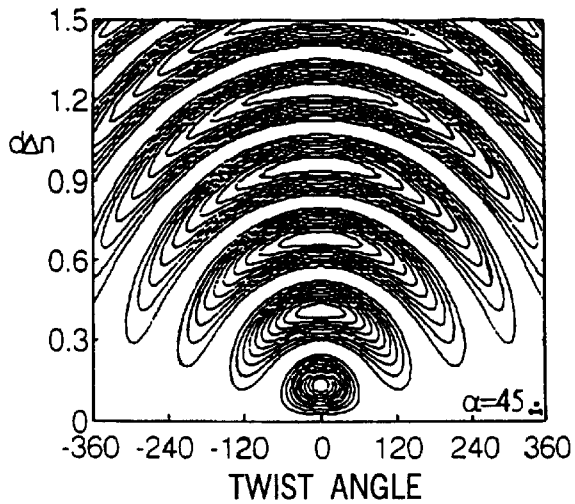
FIG. 4 Reflectance=0.7 contour line of the MTB mode for a polarizer angle of 0° or 90°.
Figure 3:
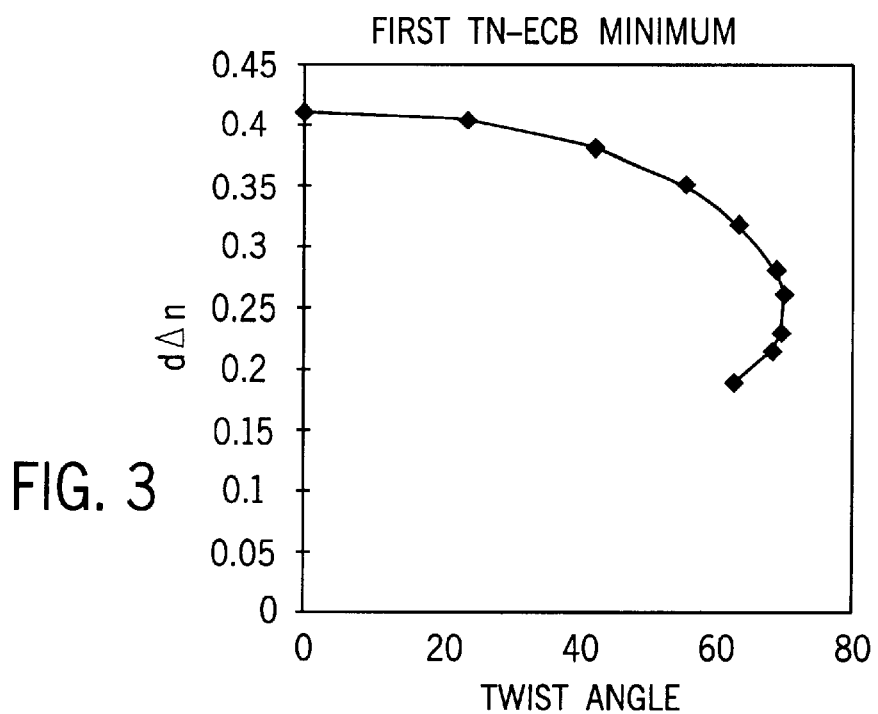
Figure 4:
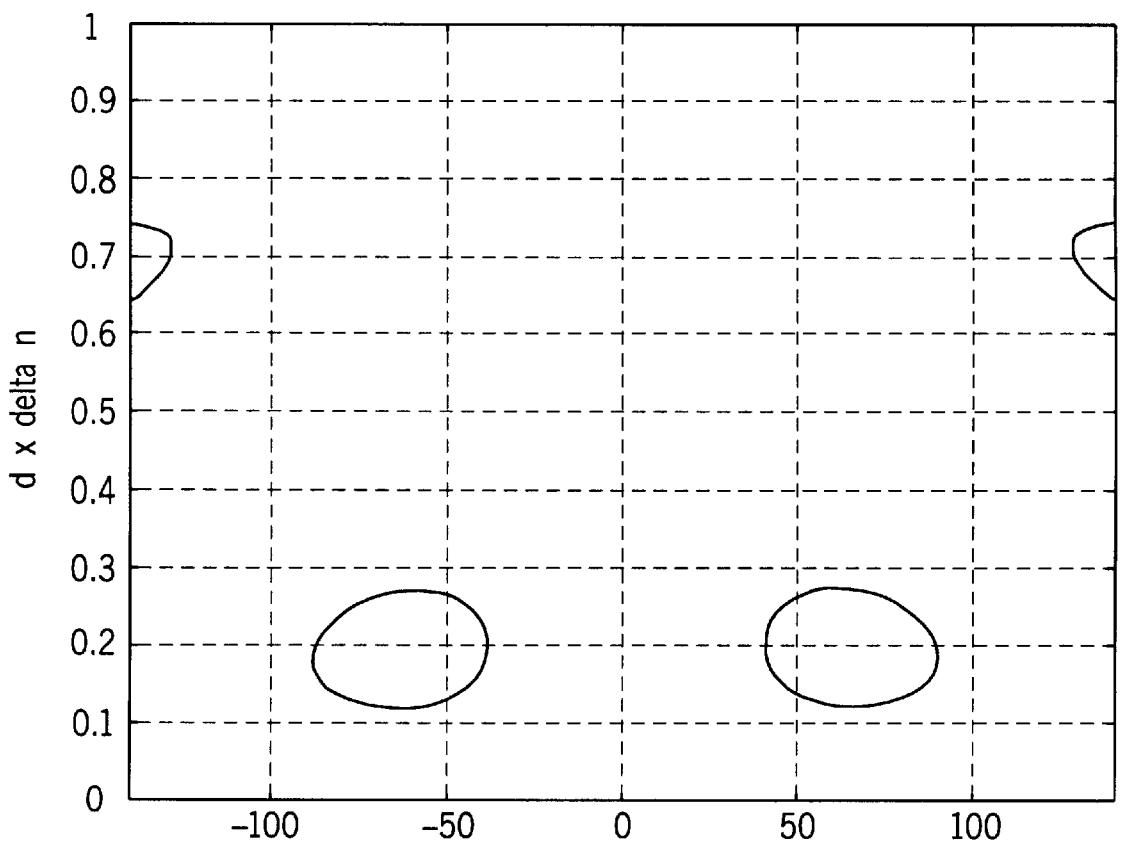
Figure 5:
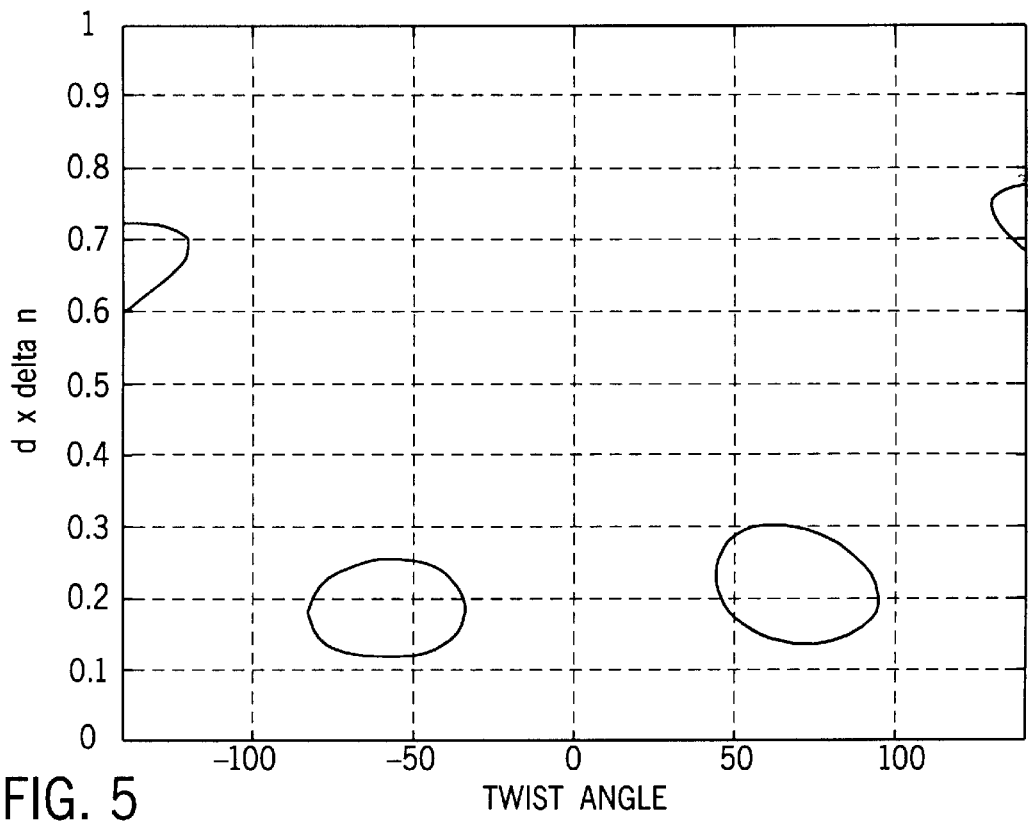
FIG. 5 Reflectance=0.7 contour line of the MTB mode for a polarizer angle of 5° or 95°.
Figure 6:
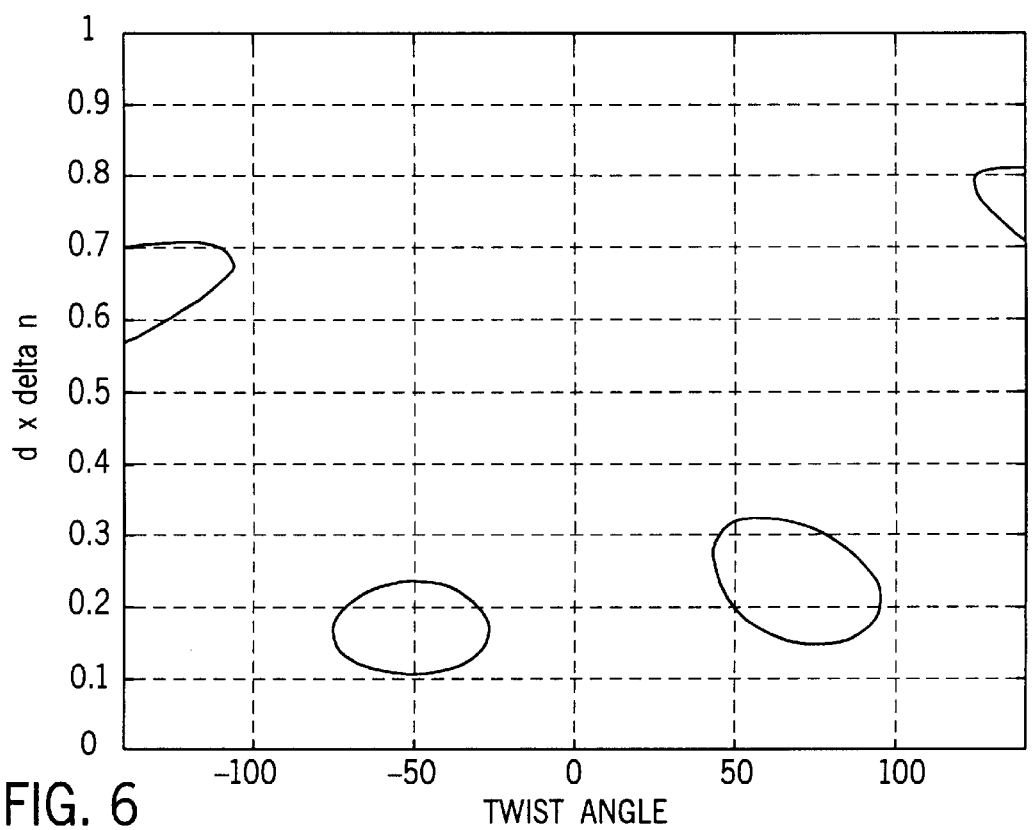
FIG. 6 Reflectance=0.7 contour line of the MTB mode for a polarizer angle of 10° or 100°.
Figure 7:
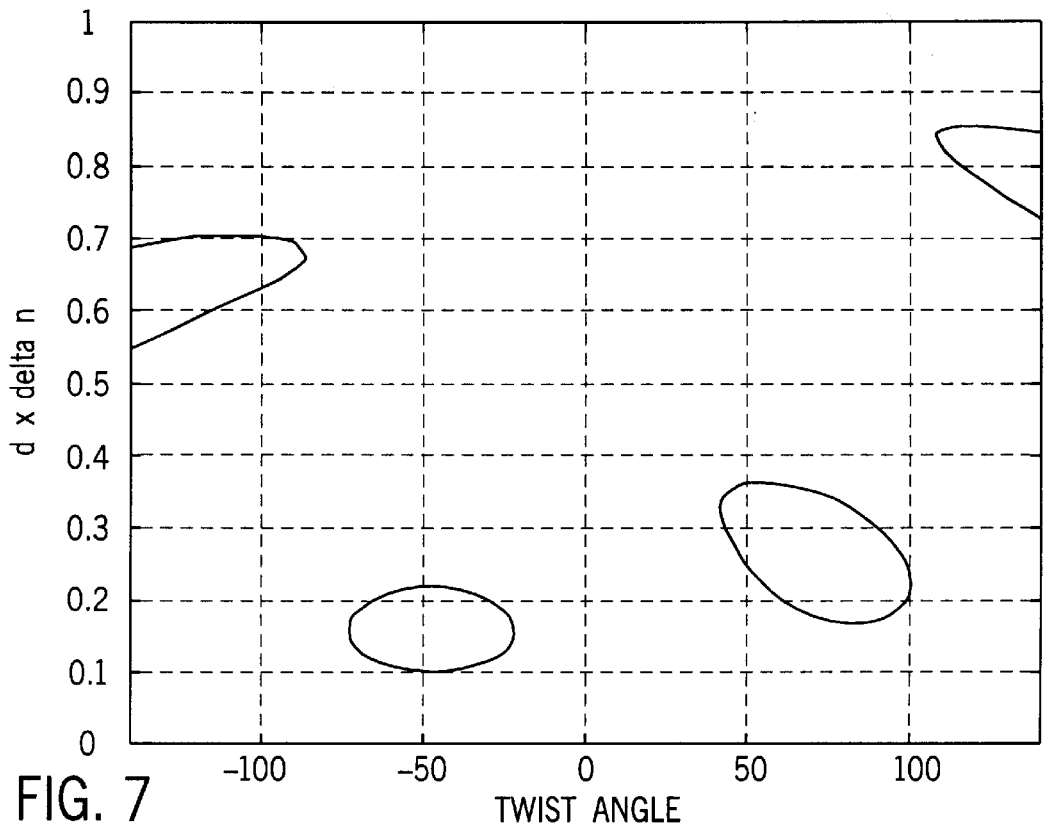
FIG. 7 Reflectance=0.7 contour line of the MTB mode for a polarizer angle of 15° or 105°.
Figure 8:
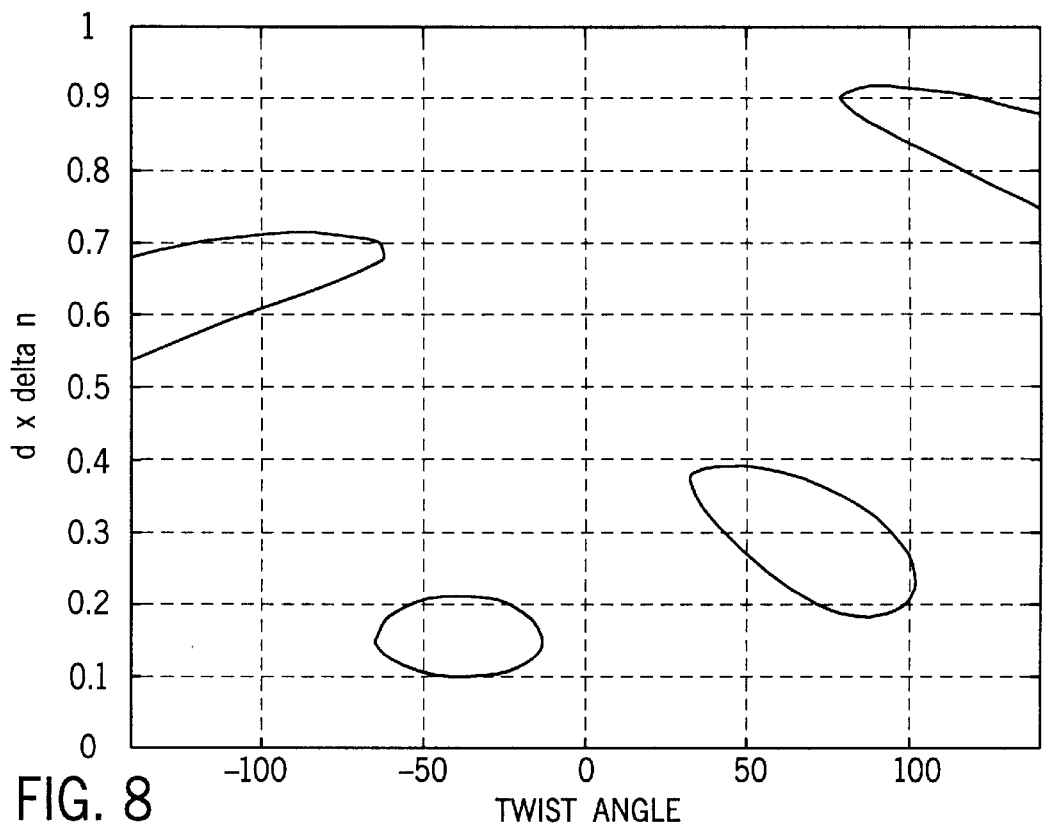
FIG. 8 Reflectance=0.7 contour line of the MTB mode for a polarizer angle of 20° or 110°.
Figure 9:
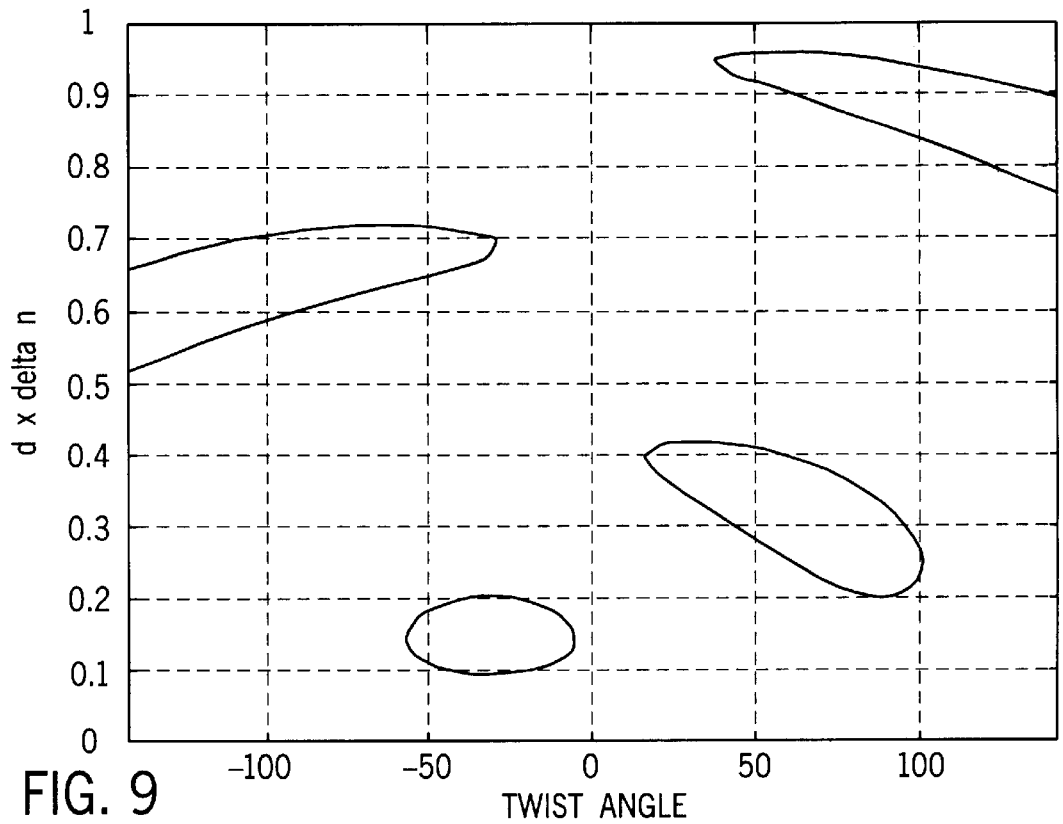
FIG. 9 Reflectance=0.7 contour line of the MTB mode for a polarizer angle of 25° or 115°.
Figure 10:
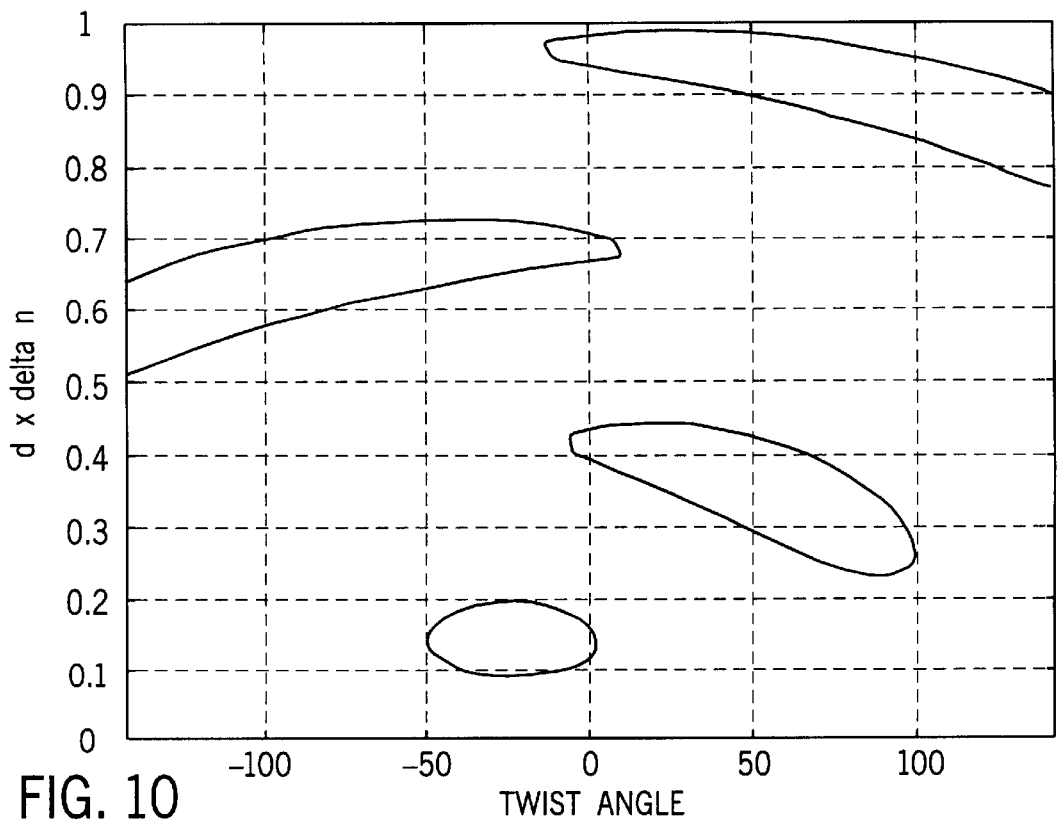
FIG. 10 Reflectance=0.7 contour line of the MTB mode for a polarizer angle of 30° or 120°.
Figure 11:
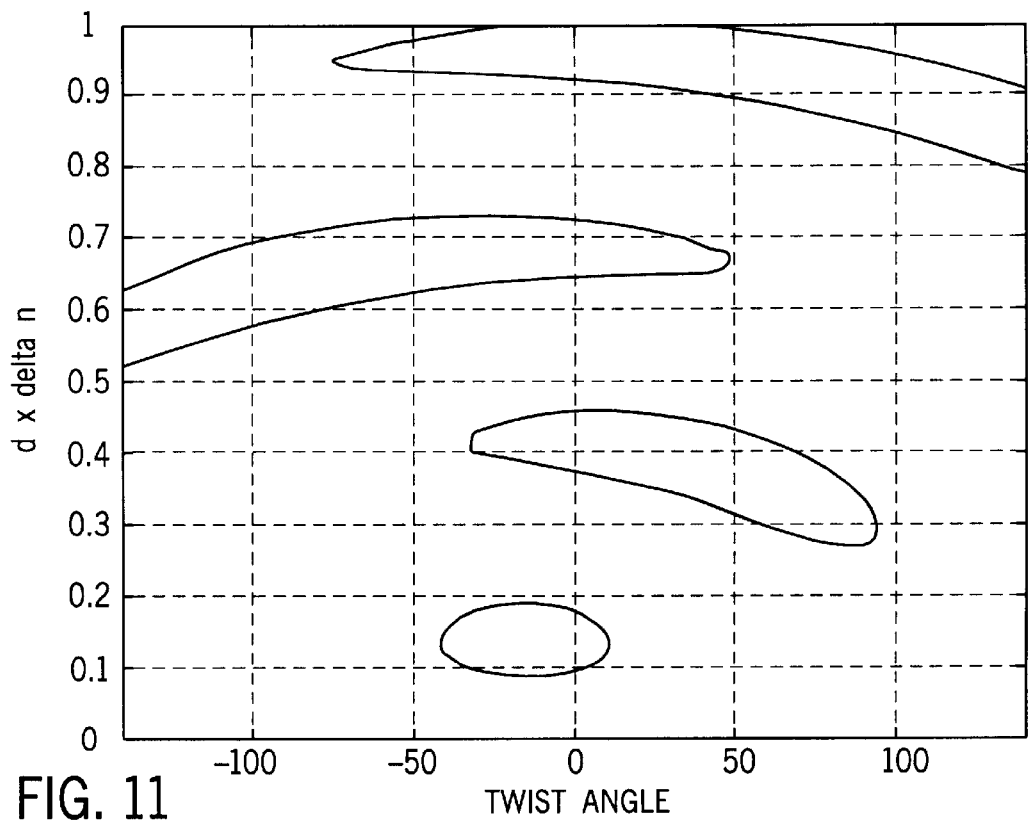
FIG. 11 Reflectance=0.7 contour line of the MTB mode for a polarizer angle of 35° or 125°.
Figure 12:
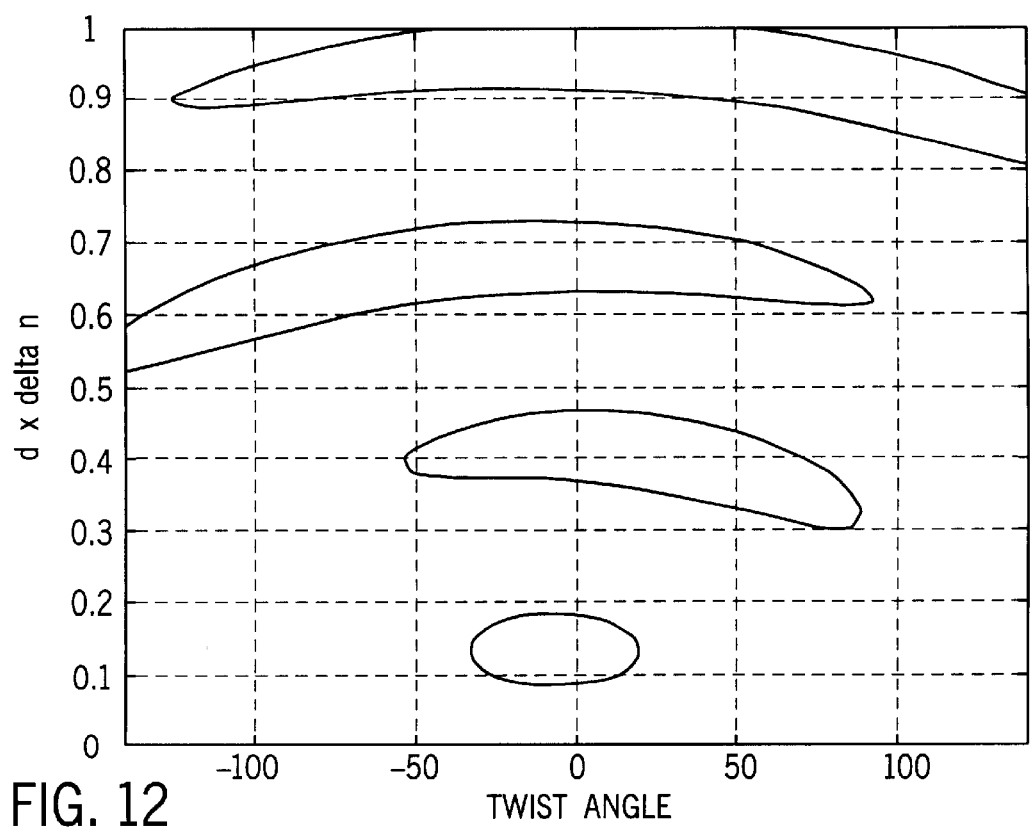
FIG. 12 Reflectance=0.7 contour line of the MTB mode for a polarizer angle of 40° or 130°.
Figure 13:
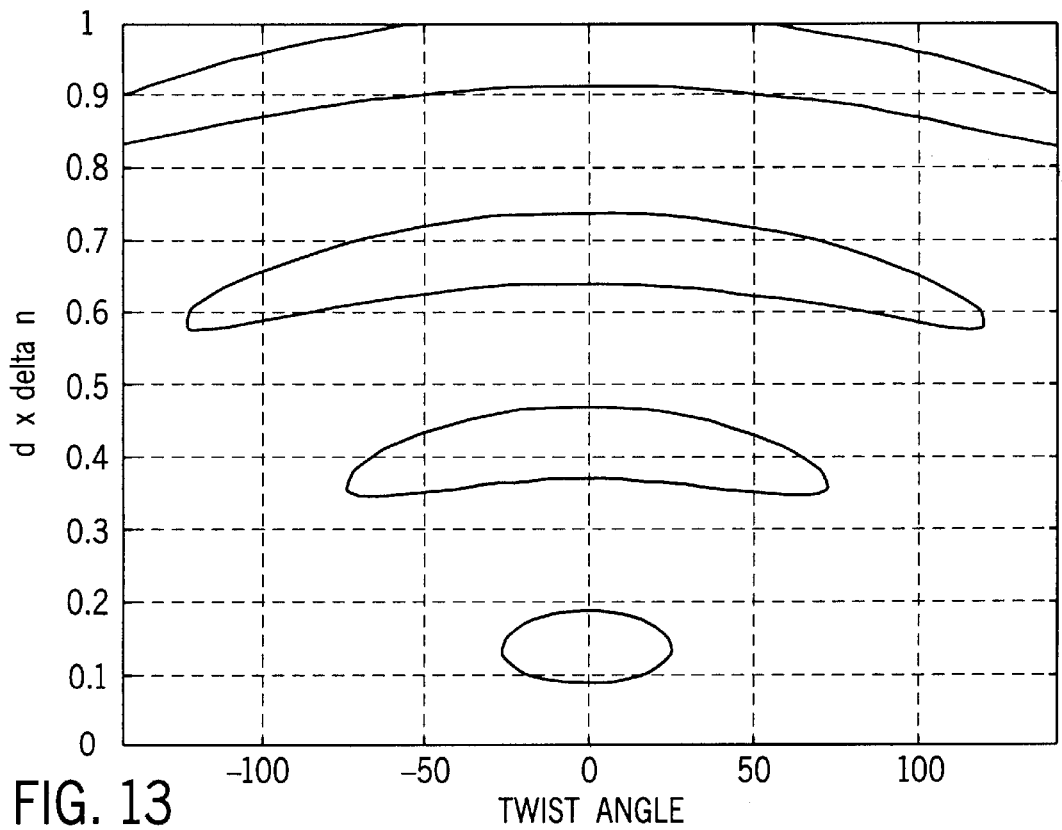
FIG. 13 Reflectance=0.7 contour line of the MTB mode for a polarizer angle of 45° or 135°.
Figure 14:
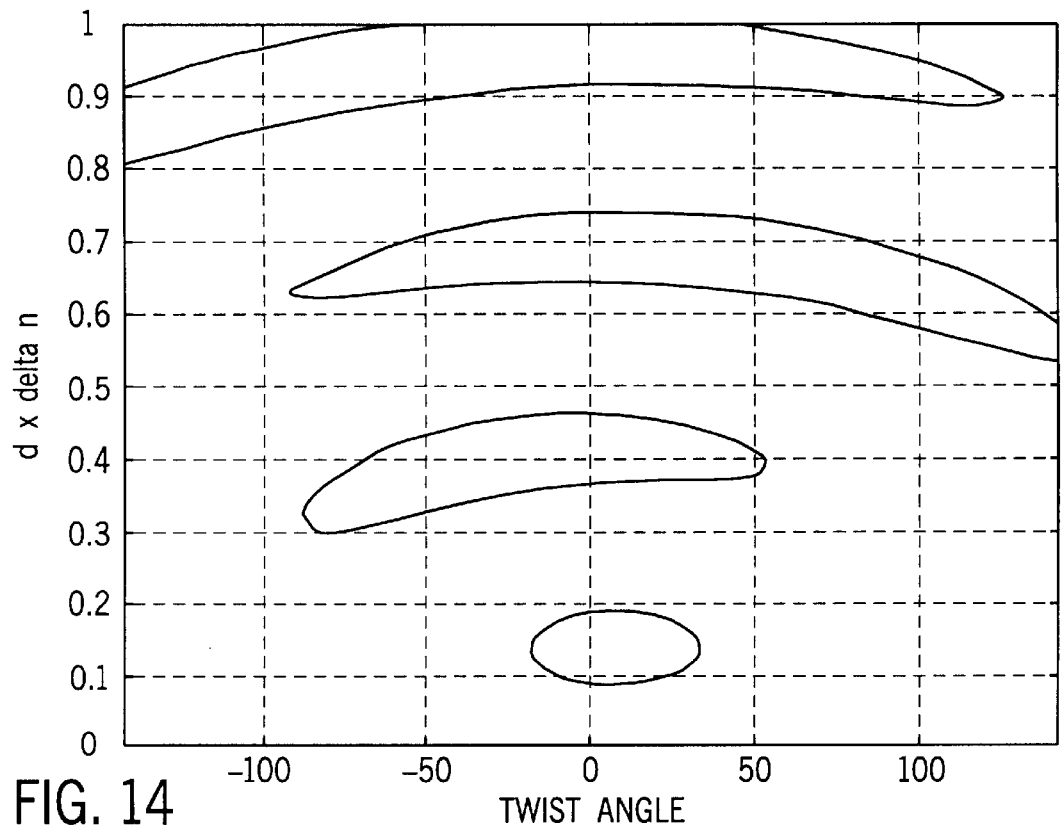
FIG. 14 Reflectance=0.7 contour line of the MTB mode for a polarizer angle of 50° or 140°.
Figure 15:
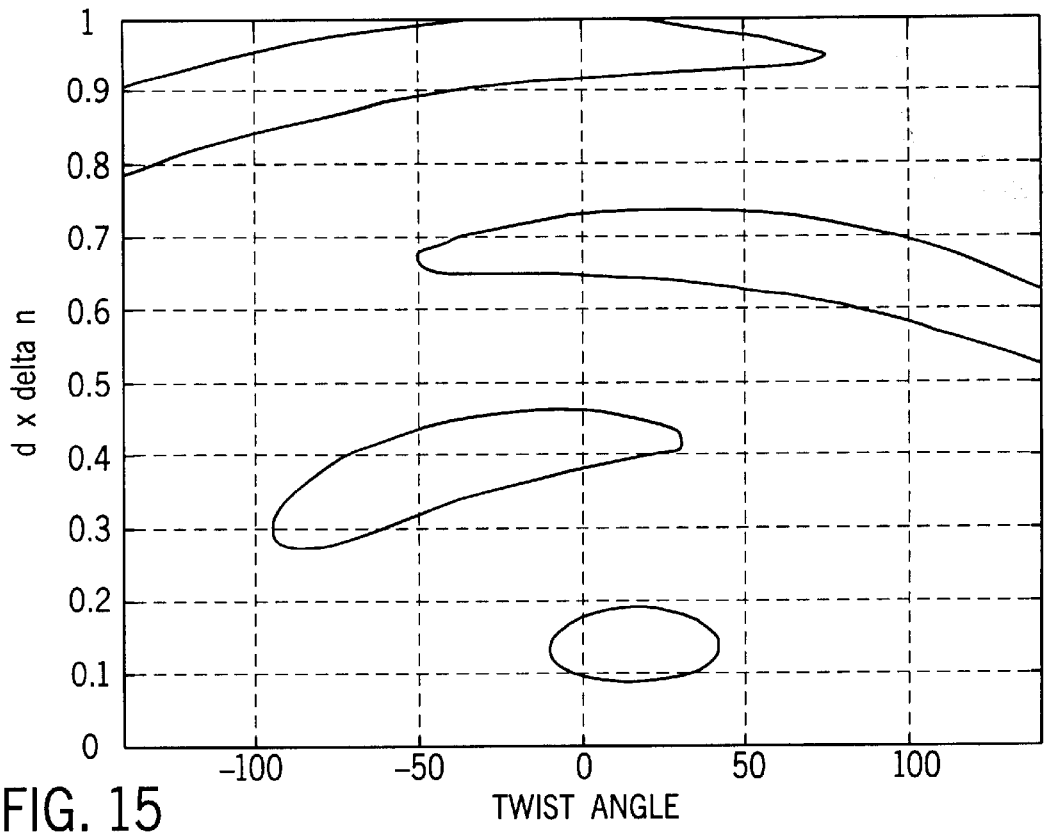
FIG. 15 Reflectance=0.7 contour line of the MTB mode for a polarizer angle of 55° or 145°.
Figure 16:
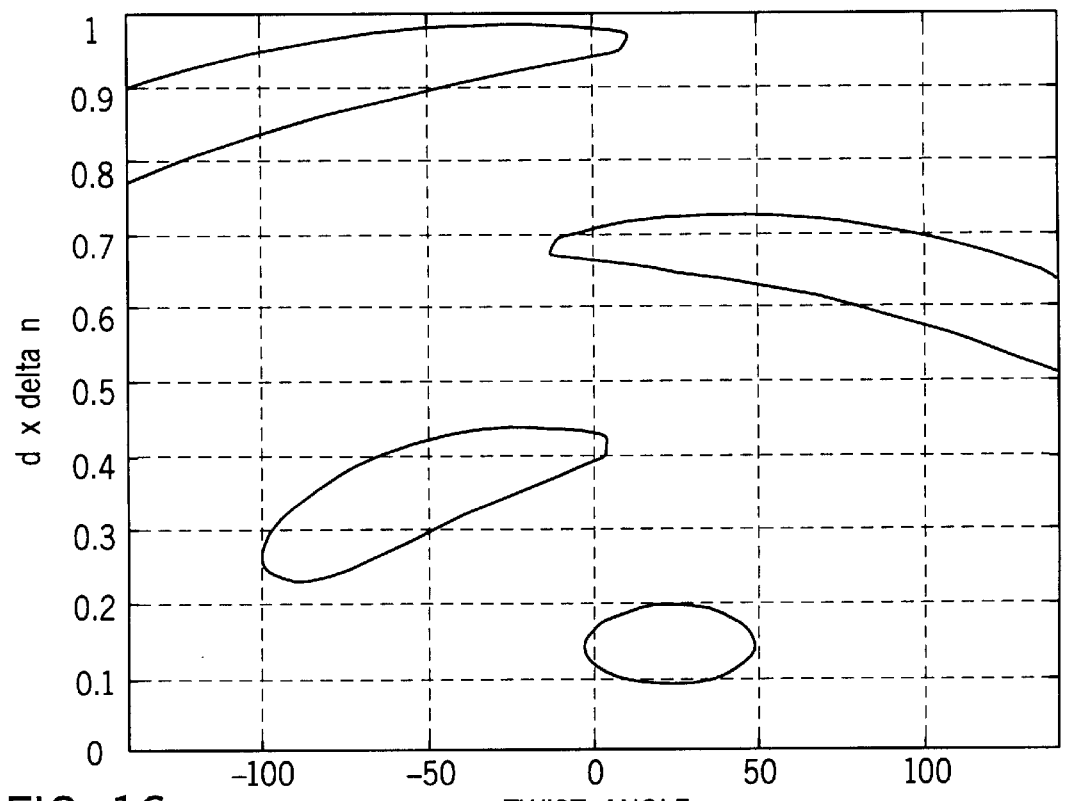
FIG. 16 Reflectance=0.7 contour line of the MTB mode for a polarizer angle of 60° or 150°.
Figure 17:
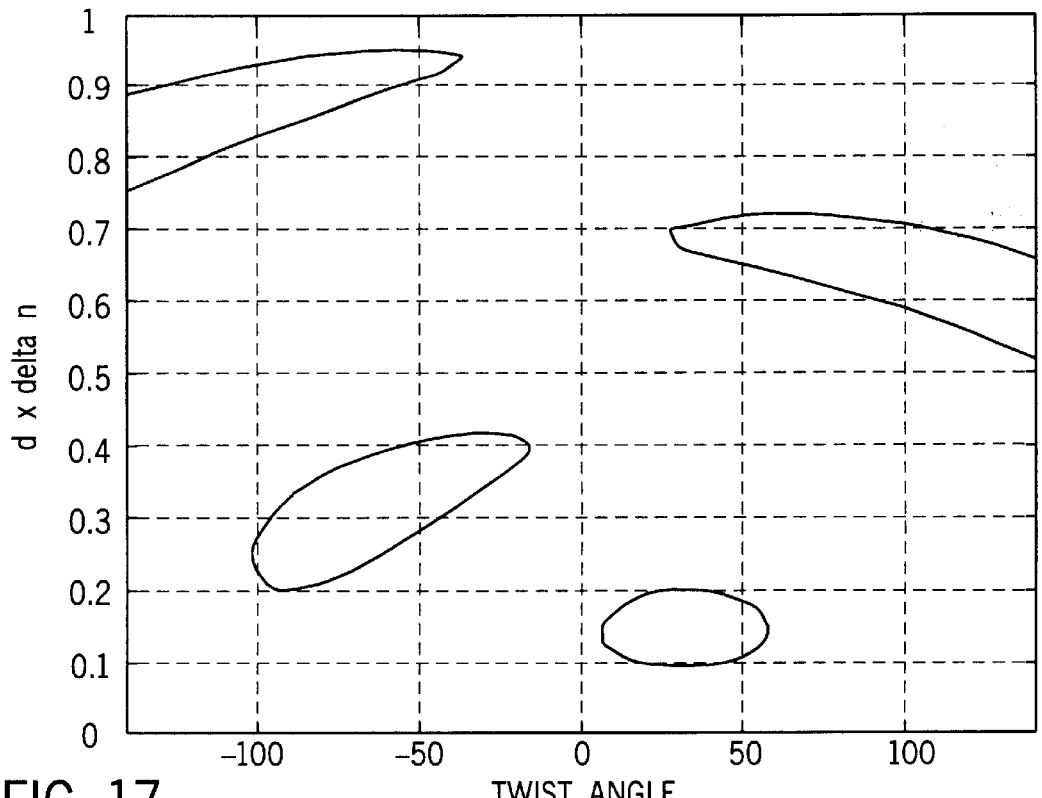
FIG. 17 Reflectance=0.7 contour line of the MTB mode for a polarizer angle of 65° or 155°.
Figure 18:
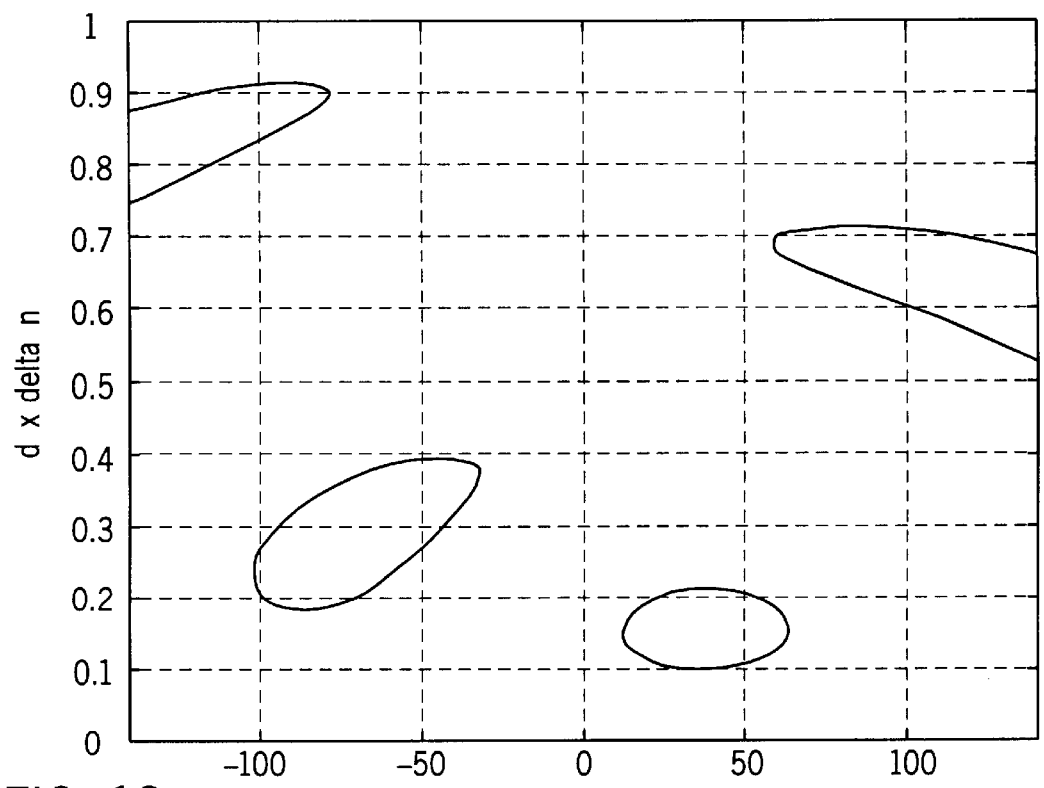
FIG. 18 Reflectance=0.7 contour line of the MTB mode for a polarizer angle of 70° or 160°.
Figure 19:
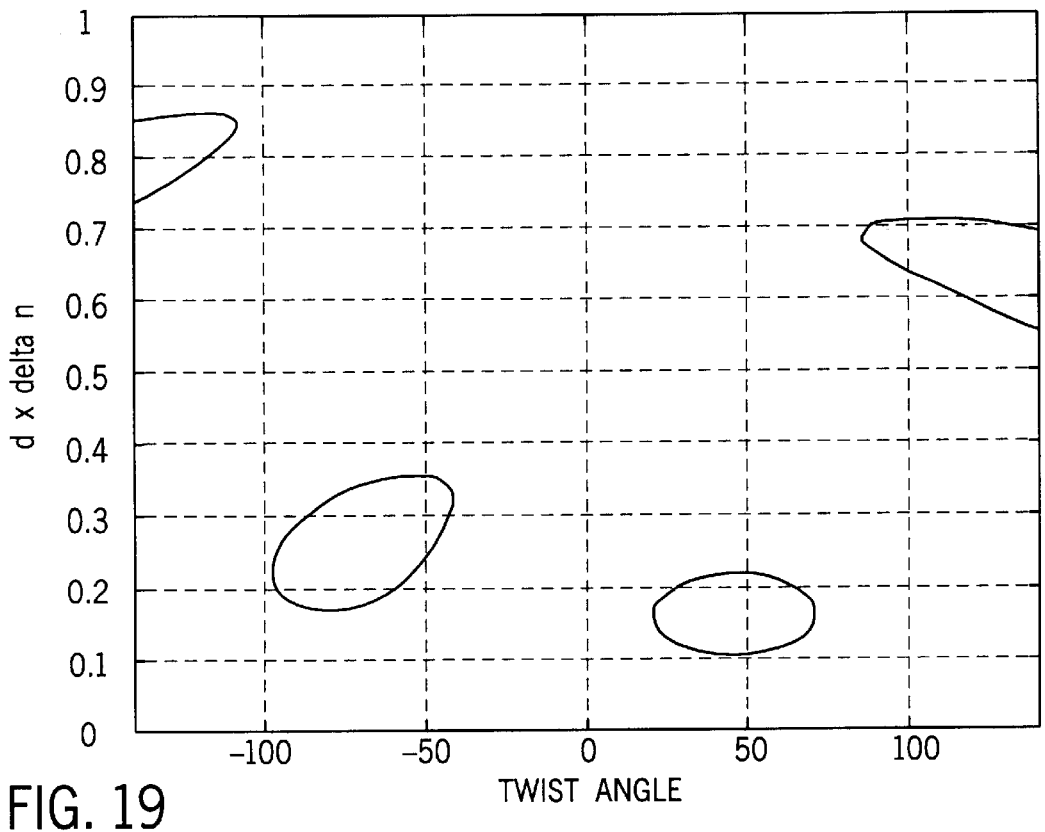
FIG. 19 Reflectance=0.7 contour line of the MTB mode for a polarizer angle of 75° or 165°.
Figure 20:
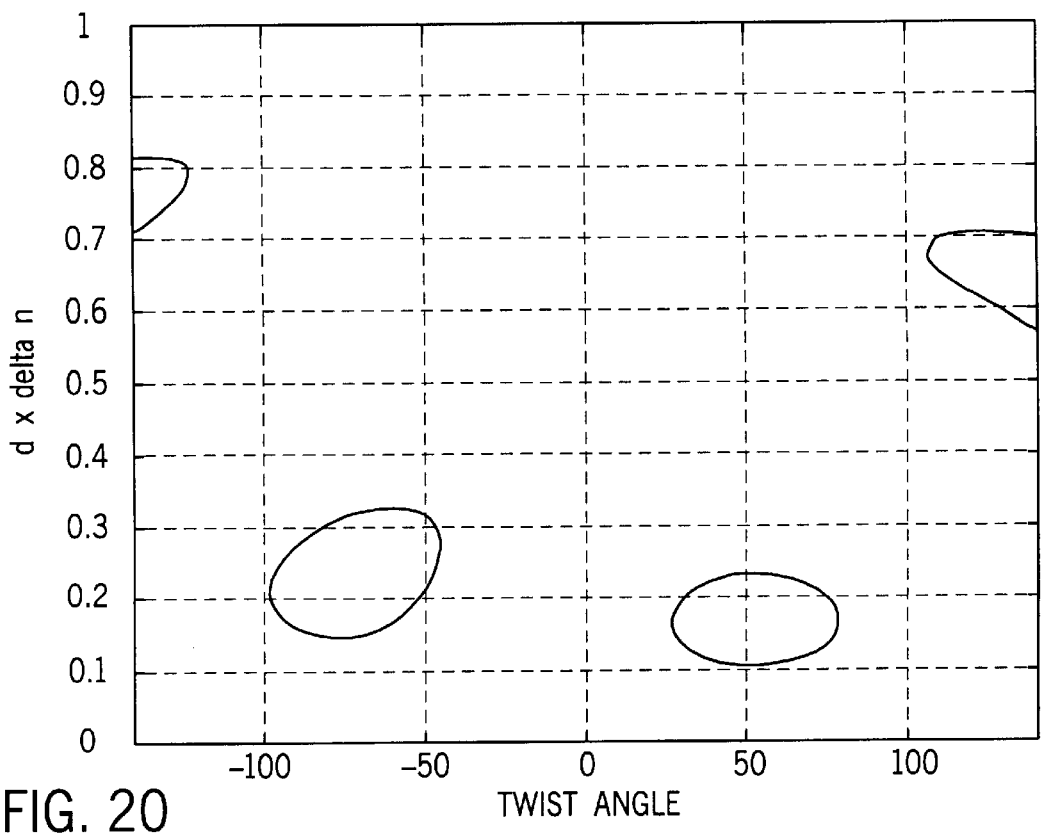
FIG. 20 Reflectance=0.7 contour line of the MTB mode for a polarizer angle of 80° or 170°.
Figure 21:
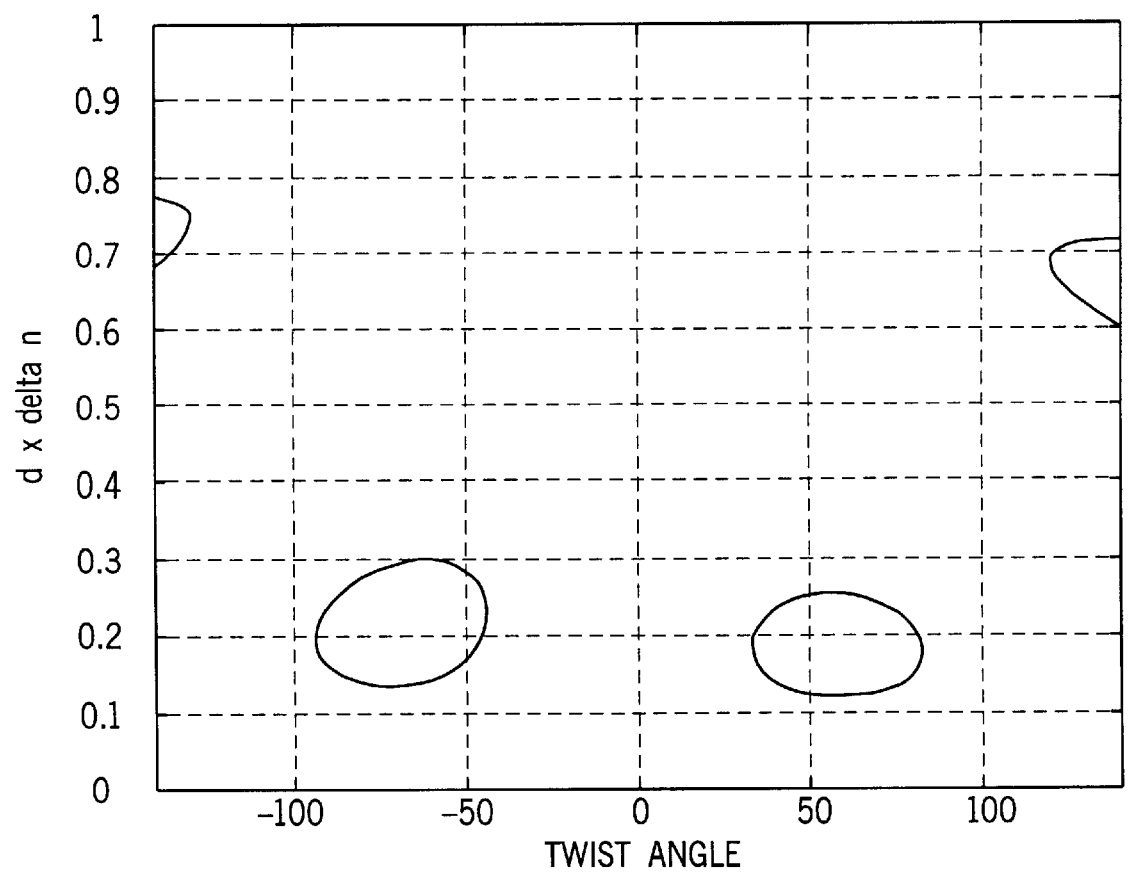
FIG. 21 Reflectance=0.7 contour line of the MTB mode for a polarizer angle of 85° or 175°.
Figure 22:
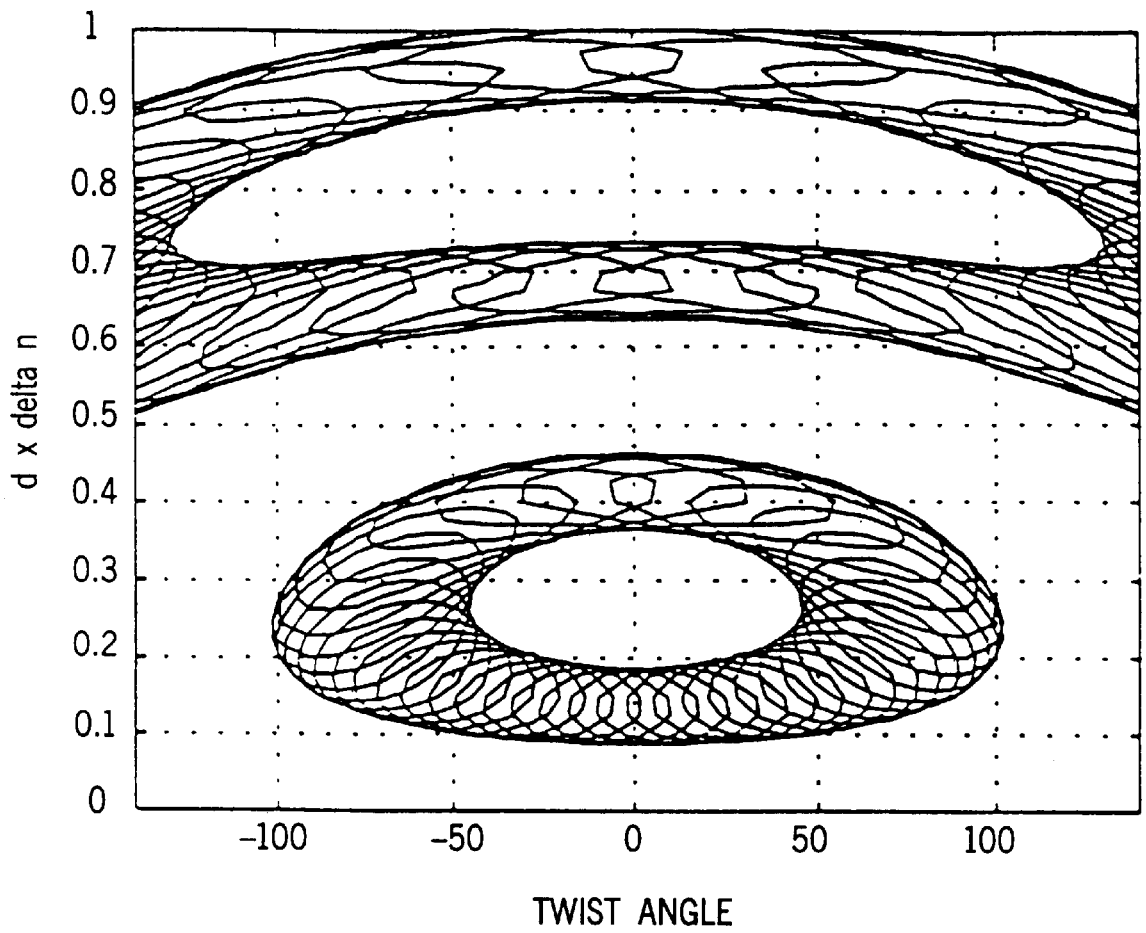
FIG. 22 Reflectance=0.7 contours for polarizer angles ranging from 0 to 90°.

It should be emphasized that Table II is by no means an exhaustive list of all the optimal MTB operating conditions. As a matter of fact, there are an infinite number of combinations of conditions as shown in FIGS. 3–5 for the MTB mode. IF one were to sacrifice the peak reflectance, the solution space for the MTB will open up even wider, leading to more possibilities.

Figure 23:
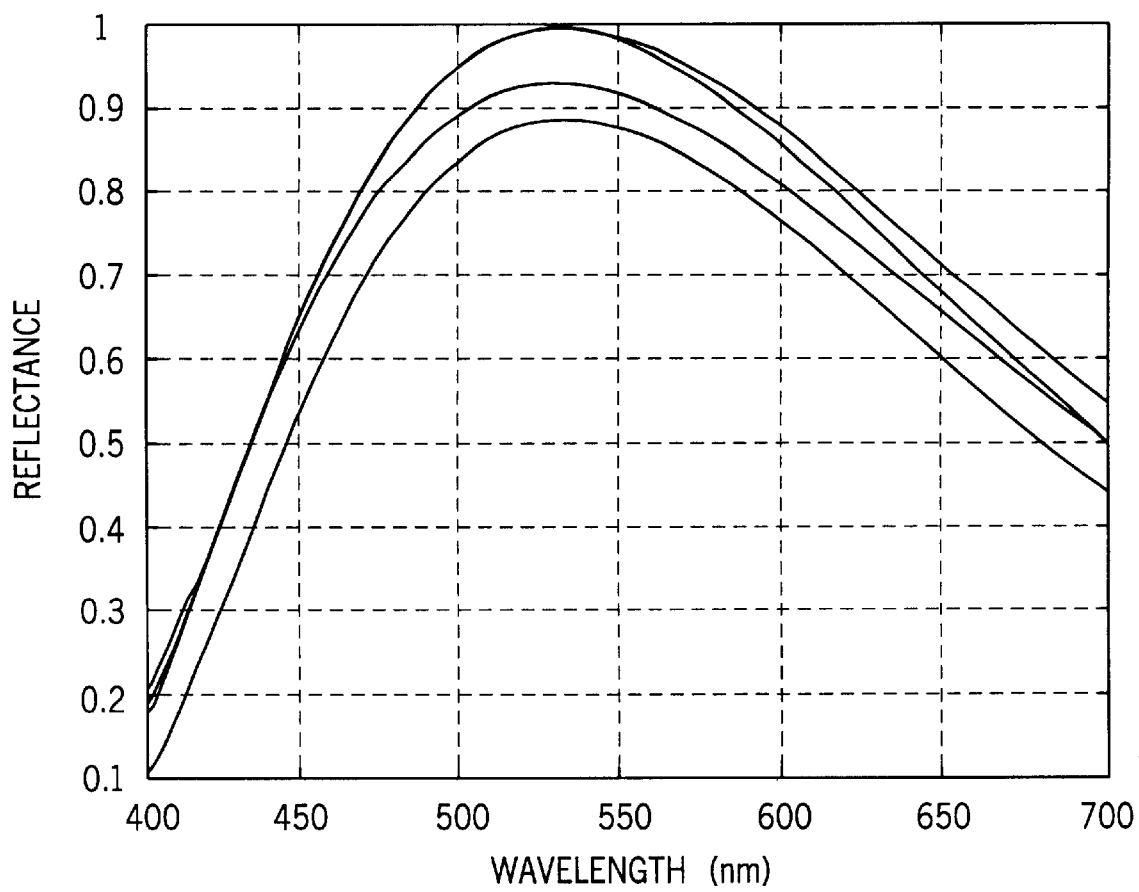
FIG. 23 Reflectance dispersion curves for a few MTB modes.

FIG. 23 shows the wavelength dependent reflectance of both the on and off states for some of the MTB modes invented here. These modes are selected because they have either (1) low wavelength dispersion, or (2) high contrast upon application of a voltage, or (3) reasonably large cell gaps so that manufacturing is possible. The values of (α, φ, dΔn) for the curves are, from the top, (26°, 43°, 0.35 μm), (30°, 50°, 0.35 μm), (34°, 54°, 0.35 μm), (40°, 63°, 0.35 μm) respectively, To verify the theoretical simulations, sample cells were made and tested. A sample cell was made with cell parameters of (30°, 70°, 0.31 μm). Liquid crystal model number ZLI-1695 from E. Merck with a low Δn of 0.0625 was used in order to increase the cell gap. The experimental cell gap was 5 μm, giving a dΔn of 0.31754 μm, which is quite close to the targeted design value. Standard rubbed polyimide films were used to aligned the LC molecules to form the 70° twist cell. The accuracy of the twist angle is better than 1° due to the equipment used. The LC cell has indium-tin-oxide as the transparent electrodes on one side and aluminum coated glass as the reflective electrode on the other side.

Figure 24:
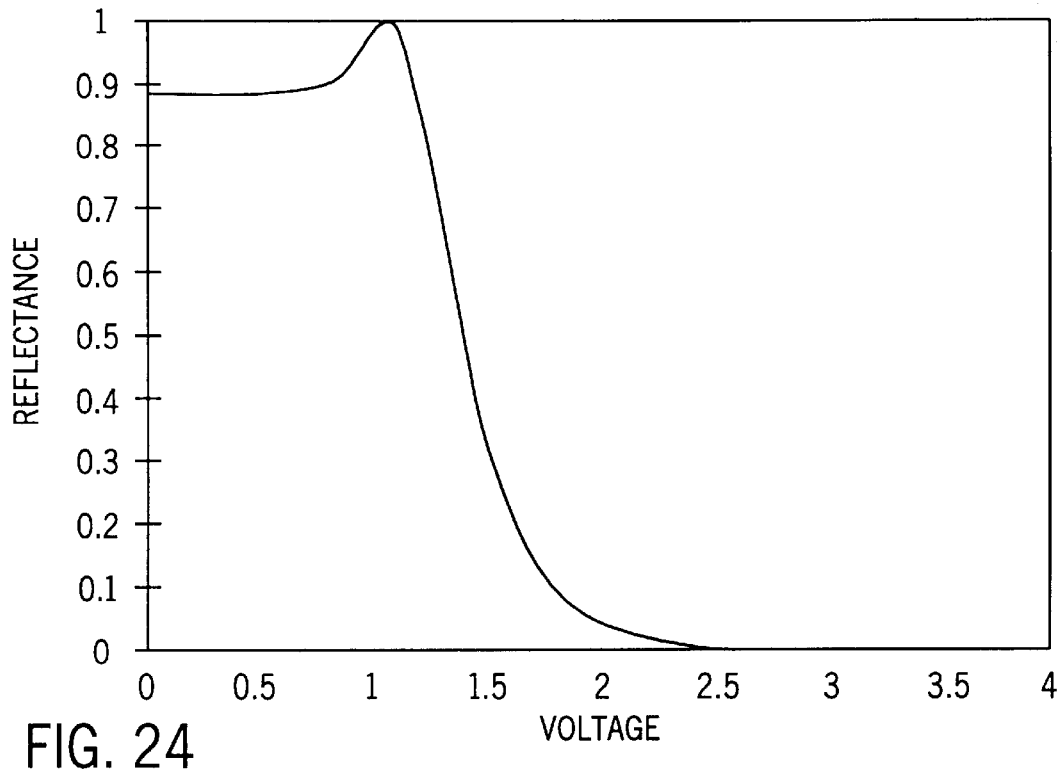
FIG. 24 Measured (normalized) reflectance vs wavelength for the (70°, 30°, 0.31 $\mu$m) display.

FIG. 24 shows the experimental reflectance-voltage curve of this new MTB mode under white fight illumination. From this figure, we can find that there is a good dark state at 3.6V. There is also a slight increase in the reflectance at 1.2V. The operation voltage for the dark state is only 2.5V which is well suitable for CMOS AMLCD applications[3].

Figure 25:
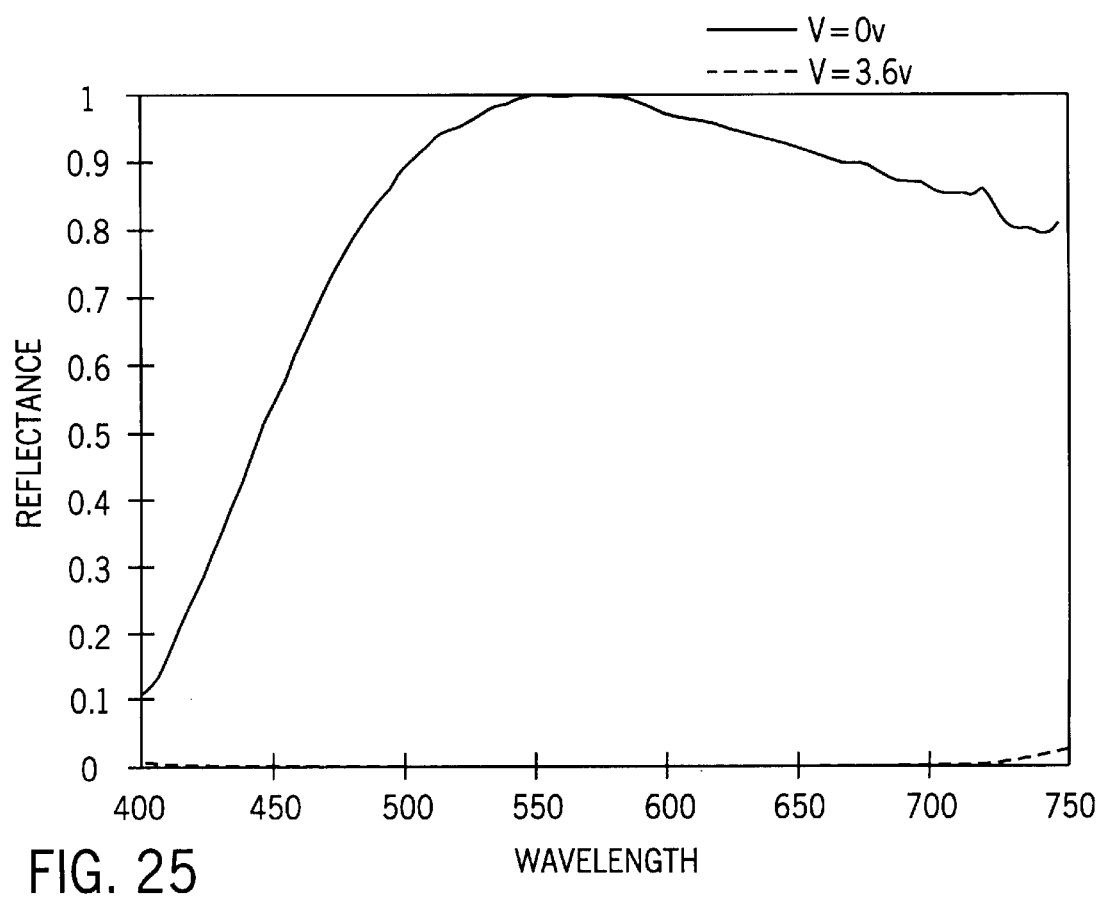
FIG. 25 Measured (normalized) reflectance vs voltage for the (70°, 30°, 0.31 $\mu$m) display.

FIG. 25 shows the experimental reflectance vs wavelength of this MTB mode. The vertical scale is normalized to the peak value. It can be seen that at long wavelengths, the reflectance agrees with the theoretical simulation quite well. At short wavelengths, however, there is some deviation from the theory. This is because the PBS used in the experiment has poor optical characteristics in this wavelength range. Another reason is that the cell thickness was not exactly 5 μm. The actual cell thickness was measured to be about 5.2 μm. So its real dΔn was about 0.325 μm.

In addition to the low operating voltage, the 5 μm cell gap is also a comfortable value for cell fabrication. In particular, it is suitable for crystalline silicon based CMOS LCD. The uniformity requirement should also be easy to satisfy for such large cell gaps. Further experiments will focus on the cell thickness of about 4.5 μm. We believe that this smaller cell gap will further lower the cell color dispersion and operating voltage.

TABLE I

Normal states of various combinations

|  | //-// polarizers (sheet type) | //-⊥ polarizers (PBS) |
|---|---|---|
| In-well modes (TN-ECB, MTB, MTN, Figure 6SCTN) | Normally black | Normally white |
| Out-well modes (HFE, RTN, RSTN) | Normally white | Normally black |

TABLE II

Reflectance for several MTB modes.

| Twist angle | Polarizer angle | dΔn (μm) | Reflectance |
|---|---|---|---|
| 50° | 28° | 0.35 | 1.0 |
| 50° | 35° | 0.36 | 1.0 |
| 50° | 25° | 0.35 | 0.94 |
| 60° | 25° | 0.32 | 1.0 |
| 60° | 35° | 0.35 | 0.97 |
| 60° | 30° | 0.34 | 1.0 |

TABLE II-continued

Reflectance for several MTB modes.

| Twist angle | Polarizer angle | dΔn (μm) | Reflectance |
|---|---|---|---|
| 70° | 30° | 0.31 | 1.0 |
| 70° | 25° | 0.30 | 1.0 |
| 70° | 36° | 0.34 | 0.95 |
| 80° | 30° | 0.3 | 0.9 |
| 80° | 20° | 0.26 | 0.97 |
| 80° | 21° | 0.28 | 1.0 |
| 90° | 25° | 0.26 | 0.87 |
| 90° | 30° | 0.3 | 0.83 |
| 90° | 20° | 0.24 | 0.9 |

What is claimed is:

1. A method of making a single polarizer reflective liquid crystal (LC) display device with $\alpha$ angle a between the polarizer and the input director of the liquid crystal device, twist angle $\phi$ retardation dΔn, and reflectance R, characterized in that the method comprises:

selecting a value for $\alpha$ and a minimum threshold for desired reflectance; using the equation below to plot the parameter space which satisfies the desired reflectance; and selecting values for $\phi$ and dΔn from said parameter space:

$$R = \left| (-\sin\alpha \cos\alpha) \cdot H \cdot M(\phi) \cdot H^{-1} \cdot M(-\phi) \cdot \begin{pmatrix} \cos\alpha \\ \sin\alpha \end{pmatrix} \right|^2 \quad (1)$$

where H is the rotation matrix $$H = \begin{bmatrix} \cos\phi & \sin\phi \\ -\sin\phi & \cos\phi \end{bmatrix} \quad (2)$$

where M is the Jones matrix of the liquid crystal cell given by $$M = \begin{pmatrix} A - iB & -C - iD \\ C - iD & A + iB \end{pmatrix} \quad (3)$$

where $$A = \cos\phi\cos\beta d + \frac{q}{\beta}\sin\phi\sin\beta d \quad (4)$$

$$B = \frac{k^c}{\beta}\cos\phi\sin\beta \quad (5)$$

$$C = \sin\phi\cos\beta d - \frac{q}{\beta}\cos\phi\sin\beta d \quad (6)$$

$$D = \frac{k^c}{\beta}\sin\phi\sin\beta d \quad (7)$$

In eq. (4)–(7), q=2π/p, where p is pitch of the LC cell; and $$\beta = [k_a^2 + q^2]^{1/2} \quad (8)$$

and the pitch is related to $\phi$ by $$qd = \phi \quad (9)$$

also $$k_a = \pi\Delta n/\lambda \quad (10)$$

where $$\Delta n = n_c - n_o \quad (11)$$

2. The method according to claim 1 wherein the single polarizer liquid crystal display device is characterized by an angle of 0±2° or 90±2° between the polarizer and the input director of the liquid crystal cell, and by a twist angle $\phi$ and retardation dΔn given by values bounded by R=0.7 contour lines.

3. The method according to claim 1 wherein the single polarizer liquid crystal display is characterized by an angle of 5±2° or 95±2° between the polarizer and the input director of the liquid crystal cell, and by a twist angle and retardation dΔn given by values bounded by R=0.7 contour lines.

4. The method according to claim 1 wherein the single polarizer liquid crystal display, is characterized by an angle of 10±2° or 100±2° between the polarizer and the input director of the liquid crystal cell, and by a twist angle and retardation dΔn given by values bounded by R=0.7 contour lines.

5. The method according to claim 1 wherein the single polarizer liquid crystal display is characterized by an angle of 15±2° or 105±2° between the polarizer and the input director of the liquid crystal cell, and by a twist angle and retardation dΔn given by values bounded by R=0.7 contour lines.

6. The method according to claim 1 wherein the single polarizer liquid crystal display is characterized by an angle of 20±2° or 110±2° between the polarizer and the input director of the liquid crystal cell, and by a twist angle and retardation dΔn given by values bounded by R=0.7 contour lines.

7. The method according to claim 1 wherein the single polarizer liquid crystal display is characterized by an angle of 25±2° or 115±2° between the polarizer and the input director of the liquid crystal cell, and by a twist angle and retardation dΔn given by values bounded by R=0.7 contour lines.

8. The method according to claim 1 wherein the single polarizer liquid crystal display is characterized by an angle of 30±2° or 120±2° between the polarizer and the input director of the liquid crystal cell, and by a twist angle and retardation dΔn given by values bounded by R=0.7 contour lines.

9. The method according to claim 1 wherein the single polarizer liquid crystal display is characterized by an angle of 35±2° or 125±2° between the polarizer and the input director of the liquid crystal cell, and by a twist angle and retardation dΔn given by values bounded by R=0.7 contour lines.

10. The method according to claim 1 wherein the single polarizer liquid crystal display is characterized by an angle of 40±2° or 130±2° between the polarizer and the input director of the liquid crystal cell, and by a twist angle and retardation dΔn given by values bounded by R=0.7 contour lines.

11. The method according to claim 1 wherein the single polarizer liquid crystal display is characterized by an angle of 45±2° or 135±2° between the polarizer and the input director of the liquid crystal cell, and by a twist angle and retardation dΔn given by values bounded by R=0.7 contour lines.

12. The method according to claim 1 wherein the single polarizer liquid crystal display is characterized by an angle of 50±2° or 140±2° between the polarizer and the input director of the liquid crystal cell, and by a twist angle and retardation dΔn given by values bounded by R=0.7 contour lines.

13. The method according to claim 1 wherein the single polarizer liquid crystal display is characterized by an angle of 55±2° or 145±2° between the polarizer and the input director of the liquid crystal cell, and by a twist angle and retardation dΔn given by values bounded by R=0.7 contour lines.

14. The method according to claim 1 wherein the single polarizer liquid crystal display is characterized by an angle of 60±2° or 150±2° between the polarizer and the input director of the liquid crystal cell, and by a twist angle and retardation dΔn given by values bounded by R=0.7 contour lines.

15. The method according to claim 1 wherein the single polarizer liquid crystal display is characterized by an angle of 65±2° or 155±2° between the polarizer and the input director of the liquid crystal cell, and by a twist angle and retardation dΔn given by values bounded by R=0.7 contour lines.

16. The method according to claim 1 wherein the single polarizer liquid crystal display is characterized by an angle of 70±2° or 160±2° between the polarizer and the input director of the liquid crystal cell, and by a twist angle and retardation dΔn given by values bounded by R=0.7 contour lines.

17. The method according to claim 1 wherein the single polarizer liquid crystal display is characterized by an angle of 75±2° or 165±2° between the polarizer and the input director of the liquid crystal cell, and by a twist angle and retardation dΔn given by values bounded by R=0.7 contour lines.

18. The method according to claim 1 wherein the single polarizer liquid crystal display is characterized by an angle of 80±2° or 170±2° between the polarizer and the input director of the liquid crystal cell, and by a twist angle and retardation dΔn given by values bounded by R=0.7 contour lines.

19. The method according to claim 1 wherein the single polarizer liquid crystal display is characterized by an angle of 85±2° or 175±2° between the polarizer and the input director of the liquid crystal cell, and by a twist angle and retardation dΔn given by values bounded by R=0.7 contour lines.

20. The method according to claim 1 wherein the single crystal polarizer liquid crystal display device is characterized by indium-tin oxide as transparent electrode and aluminum coated glass as reflective electrode.

21. The method according to claim 20 wherein the single polarizer liquid crystal display device is characterized by comprising a 70° twist cell.

* * * * *